United States Patent [19]

Lenander et al.

[11] Patent Number: 5,202,065
[45] Date of Patent: Apr. 13, 1993

[54] ULTRASONIC METHOD OF PRODUCING A SCORE IN A THERMOPLASTIC FILM POUCH

[75] Inventors: John G. Lenander, Gurnee; Robert W. Hinley, Spring Grove, both of Ill.

[73] Assignee: Baxter International Inc., Deerfield, Ill.

[21] Appl. No.: 683,638

[22] Filed: Apr. 11, 1991

[51] Int. Cl.$^5$ .............................................. B29C 53/06
[52] U.S. Cl. ........................................ 264/23; 264/70; 264/564; 264/565; 264/566; 264/146; 264/159; 425/174.2; 425/291
[58] Field of Search ................. 264/23, 70, 567, 564, 264/145, 295, 146, 157, 159, 322, 565, 566; 425/174.2, 174, 174.6, 291

[56] References Cited

U.S. PATENT DOCUMENTS

| | | | |
|---|---|---|---|
| 2,779,973 | 2/1957 | Holdaway et al. | 264/146 |
| 3,186,628 | 6/1965 | Rohde . | |
| 3,379,814 | 4/1968 | Bracey, Jr. | 264/322 |
| 3,392,219 | 7/1968 | Smith et al. | 264/23 |
| 3,500,727 | 3/1970 | Behr et al. | 264/146 |
| 3,647,599 | 3/1972 | Gardner . | |
| 3,650,454 | 3/1972 | Coucoulas . | |
| 3,687,787 | 8/1972 | Grand, III . | |
| 3,909,582 | 9/1975 | Bowen . | |
| 3,953,056 | 4/1976 | Roberts | 264/295 |
| 4,179,252 | 12/1979 | Seufert . | |
| 4,217,085 | 8/1980 | Ljungberg et al. | 425/291 |
| 4,229,407 | 10/1980 | Craig | 264/564 |
| 4,249,986 | 2/1981 | Obeda . | |
| 4,349,986 | 9/1982 | Tsukuda . | |
| 4,534,819 | 8/1985 | Payet et al. . | |
| 4,539,793 | 9/1985 | Malek . | |
| 4,589,194 | 5/1986 | Roy . | |
| 4,713,132 | 12/1987 | Abel et al. . | |
| 4,778,058 | 10/1988 | Yamazaki et al. . | |
| 4,781,296 | 11/1988 | Morris et al. . | |

FOREIGN PATENT DOCUMENTS 52-28312 3/1977 Japan ...................................... 264/23

Primary Examiner—Jeffery Thurlow
Attorney, Agent, or Firm—Kay H. Pierce; Paul C. Flattery

[57] ABSTRACT

A method of creating a score in a pouch formed from a thermoplastic film is described. Ultrasonic energy is used to create the score in a film that is later formed into a pouch. The score can be used to open the pouch by pulling opposite sides of the scored area. The ultrasonic force is applied to the film as a part of a downstream process in a blown film manufacturing line to produce the pouch.

19 Claims, 5 Drawing Sheets

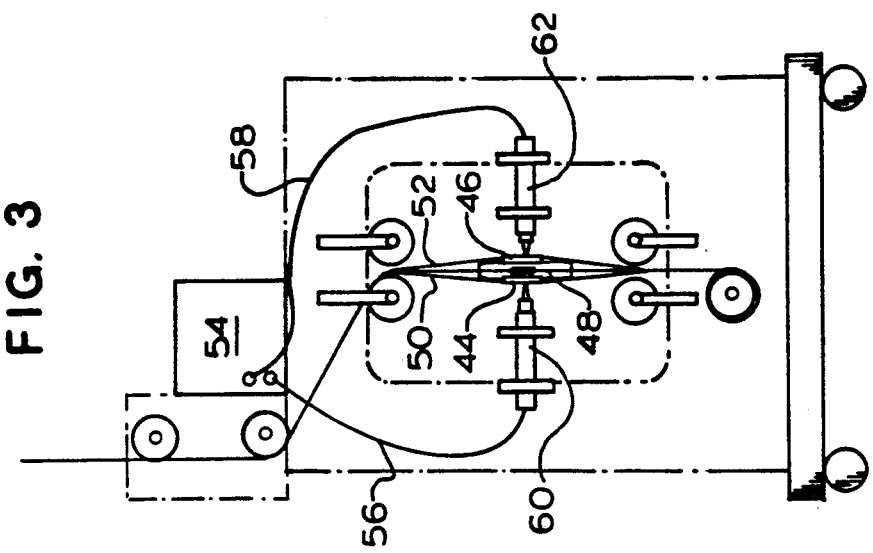
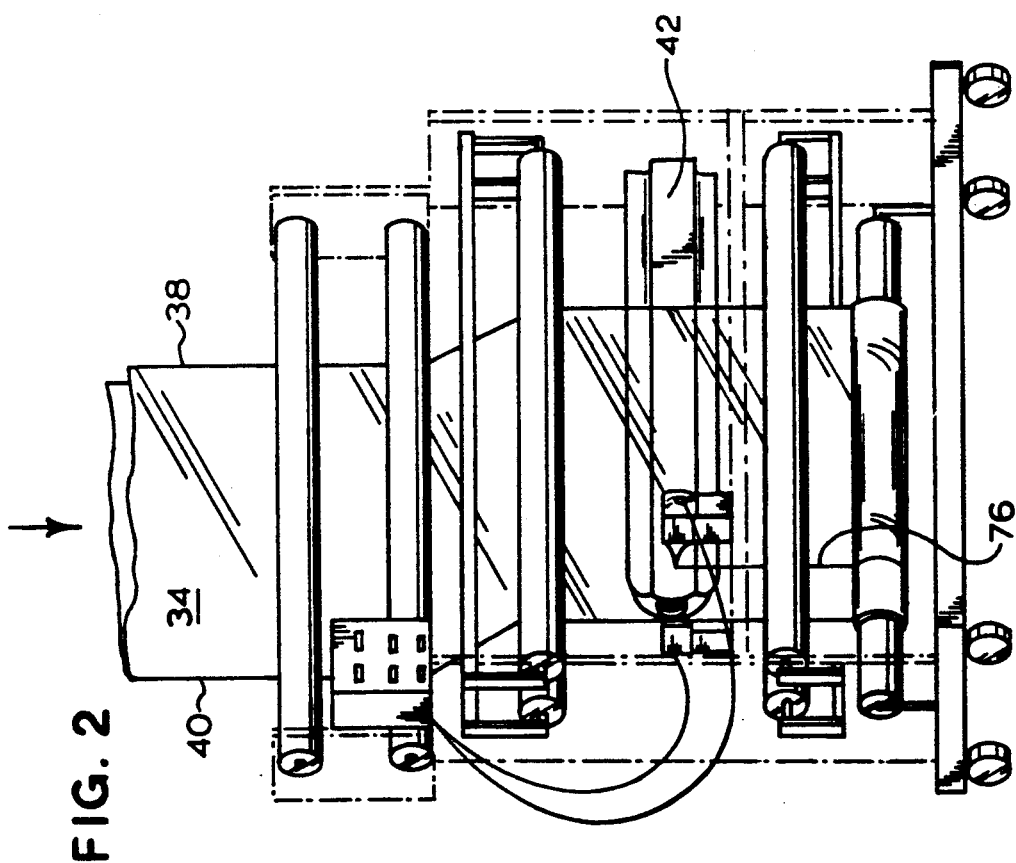

FIG. 7
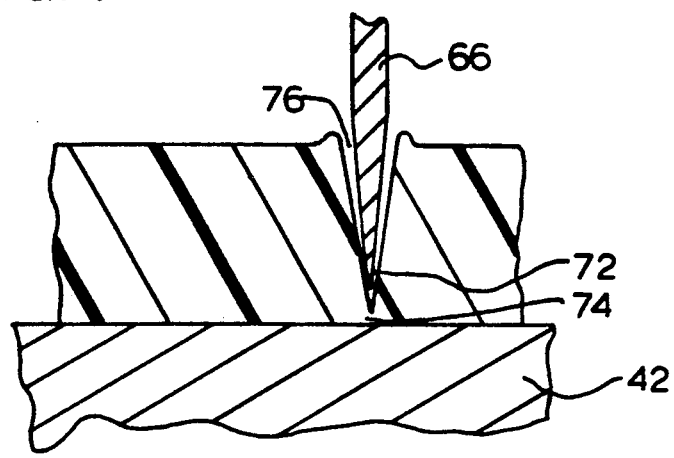
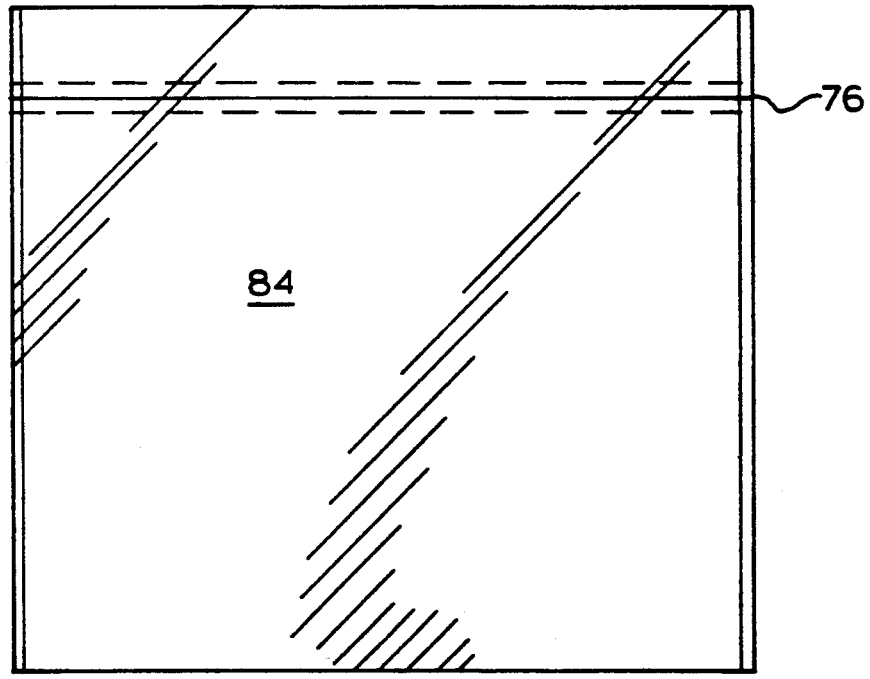
FIG. 8

ULTRASONIC METHOD OF PRODUCING A SCORE IN A THERMOPLASTIC FILM POUCH

BACKGROUND OF THE INVENTION

1. Field of the Invention

This invention relates generally to methods of creating scores in thermoplastic film and more specifically to methods of creating scores in thermoplastic film using ultrasonic energy.

2. Description of the Prior Art

Plastic pouches are used in various industries to contain many types of materials. In the medical industry, plastic pouches are frequently used to contain medical instruments, and other devices necessary for various procedures. It often is necessary to sterilize the materials in such pouches after the pouches have been filled and sealed. Therefore, it is desirable to use materials to form the pouch which can be subjected to various methods of sterilization, such as radiation, steam, or ETO sterilization techniques. Since it is often desirable to sterilize materials within the pouch, not all materials commonly used to form pouches can be selected for medical applications. One of the preferred class of materials used to form pouches for medical applications is the class of thermoplastic films.

Thermoplastic films are desirable to use because they can be subjected to ETO and radiation sterilization. They are also desirable to use because they are generally very durable and provide a biological barrier to protect any instruments after sterilization. Another advantage of using thermoplastic materials to form pouches for medical applications is that the pouches can be made using clear thermoplastic films which allow medical personnel to easily see the contents of a pouch.

As noted above, thermoplastic pouches are generally very durable. Therefore, a means must be provided in the pouch to allow medical personnel to easily open the pouch. Generally, a score line, or line of weakness, is provided across a pouch to provide a means of enabling medical personnel to easily open a pouch by pulling on the pouch on opposite sides of the score line. It is important that the score line sufficiently weaken the pouch to allow easy opening but not to allow inadvertent breakage or tearing of the pouch during shipping or handling. Therefore, it is important that the score line have a highly predictable strength value that is lower than the strength value of the rest of the pouch and that can be consistently reproduced during the manufacturing process of the pouch. If it is possible to produce a score line with a highly predictable strength value, then the rate of scrap during the manufacturing process is greatly reduced. The possibility of inadvertent opening of a pouch after it has been filled, sealed and sterilized is also greatly reduced, thus reducing long-term medical costs.

Thermoplastic pouches having score lines have been produced in the past using various manufacturing techniques and materials. One commonly used technique is to interrupt the flow of a molten thermoplastic material as it exits an extrusion die. This can be accomplished by inserting a probe across the path of the molten material. After the material cools and hardens, the interruption of flow results in an area of weakness in the resulting thermoplastic film. This method of interrupting the flow of molten material from a die can be used in either blown-film or flat-sheet-extrusion manufacturing processes.

Another technique for producing a score in a pouch commonly used with laminated materials is to apply directed radiant energy onto the thermoplastic film to vaporize a portion of the laminate to produce an area of decreased thickness. This process is described in U.S. Pat. No. 3,909,582 to Bowen.

Another technique for producing scores in pouches is to pass the material forming the pouch through matched embossing rollers which deform a selected portion of the pouch to produce a score having a desired depth.

While each of the techniques of producing score lines described above has value in various applications, it has been found that generally speaking, such techniques do not produce the desired accuracy and predictability required for certain medical applications. In particular, if a thermoplastic film is used that is very durable, it can sometimes be difficult to create a score line of sufficient yet predictable weakness using the techniques described above. Also, many of the techniques described above are limited in that the rate at which material can be scored can limit the overall speed at which pouches can be produced. Therefore, a need existed to develop a method of producing score lines in highly durable plastic film which is predictable and does not limit the rate at which film can be produced.

OBJECTS OF THE INVENTION

It is an object of the subject invention to provide a technique for producing a highly predictable score line in a thermoplastic film.

It is also an object of the invention to provide a technique for producing score lines which does not limit the rate at which film can be extruded during a blown film manufacturing process.

It is another object of the invention to provide a thermoplastic film pouch that is highly durable yet can be easily opened by pulling opposite sides of a score line.

There and other objects of the invention will become apparent based on the description of the invention set forth below.

SUMMARY OF THE INVENTION

The invention can be briefly described as a method of creating a predictably weakened area in a thermoplastic film. The method involves the following steps. First, a molten thermoplastic material is extruded through an annular orifice to create a molten continuous tube. Then gas is introduced inside the molten continuous tube to control the size of the tube. By varying the quantity of gas introduced into the tube, the diameter of the molten tube can be varied. The molten continuous tube is then allowed to harden into a thermoplastic film tube. The thermoplastic film tube is then collapsed to allow opposite sides of the film tube to touch one another. This forms a flattened tube having first and second edges.

The flattened tube is then slit along the first edge to form a slit-flattened tube having first and second sides connected to one another at the second edge. The second edge of the slit-flattened is then drawn over an anvil. The anvil has first and second surfaces that are separated by a blade rim. The slit-flattened tube is drawn over the anvil such that the first side of the tube is on a first surface of the anvil and a second side of the tube is on a second, opposing surface of the anvil. Ultrasonic energy is then continuously applied to the first and second sides of the slit-flattened tube as they are drawn over the anvil to create a line of predictable weakness on both the first and second sides of the slit-flattened tube.

BRIEF DESCRIPTION OF THE DRAWINGS

FIG. 2 is a schematic view of a scoring station in accordance with the preferred embodiment of the invention;

FIG. 3 is an end view of the scoring station illustrated in FIG. 2;

FIG. 7 is a cross-sectional view of an ultrasonic tip as it scores a thermoplastic film;

FIG. 8 is a perspective view of a pouch having a score line produced using ultrasonic energy;

DETAILED DESCRIPTION OF THE PREFERRED EMBODIMENT

Figure 1:
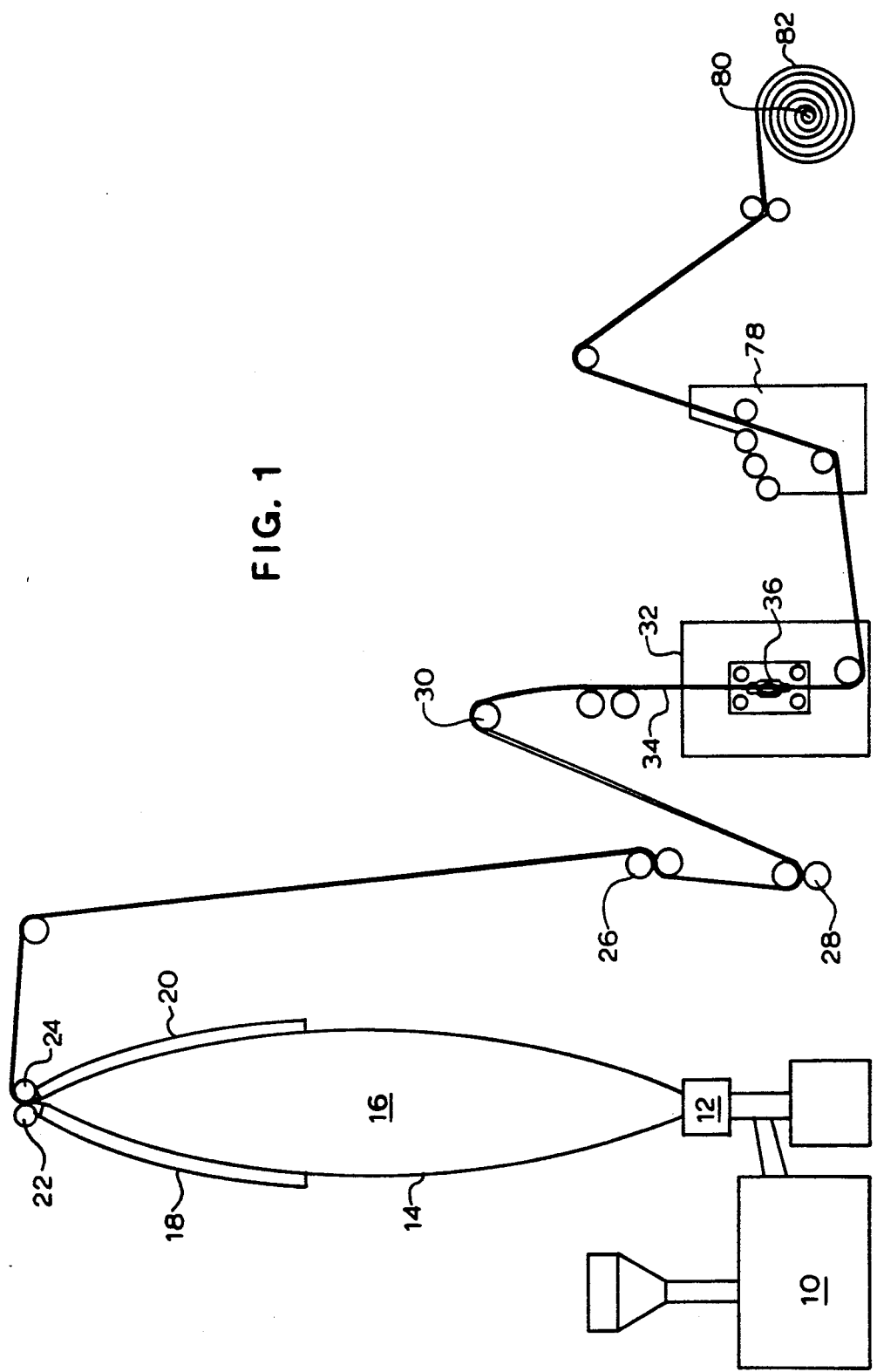
FIG. 1 is a schematic view of the overall process used to manufacture thermoplastic film later used to form pouches in accordance with the subject invention.

FIG. 1 is a schematic view of the overall process used to manufacture thermoplastic film later used to form pouches in accordance with the subject invention. As can be seen in the figure, an extruder 10 melts a thermoplastic resin and forces it through a die 12 to produce a molten continuous tube 14. A stream of gas 16 is introduced inside the molten continuous tube to control the diameter of the tube. By varying the quantity of gas introduced into the tube, the diameter of the molten tube can be varied. In the preferred embodiment of the invention, the diameter of the molten tube can be varied in relation to the diameter of the orifice of the die by a ratio ranging from 0.8:1 to 2.0:1. This allows pouches of various widths to be produced using a single die. The ratio between tube diameter and orifice diameter is commonly referred to as the blow up ratio.

After the diameter of the molten continuous tube has been sized using the technique described above, the molten continuous tube is allowed to cool and harden into a thermoplastic film. The film is then collapsed using collapsing frames 18, 20 and pinch rollers 22, 24 which force opposite sides of the film to touch one another and to form a flattened tube having first and second edges. The rate at which the pinch rollers rotate controls the speed at which film is drawn from the die 12.

The flattened tube is then passed through a series of rollers to guide the material to the next phase of the manufacturing process. One set of rollers 26 serves as a steering roll assembly. The purpose of the steering roll assembly is to maintain the position of the film so that one edge of the film is always in a fixed position. The film then continues through a pair of pinch rollers 28 and an idler roller 30 to a slitting station 32. At the slitting station, one edge of the flattened tube is slit to form a "slit-flattened tube" 34. The tube 34 then enters a scoring unit 36 which is illustrated in greater detail in FIG. 2.

As can be seen in FIG. 2, the tube 34 has a first edge 38 which is slit and a second edge 40 which is folded. The tube 34 is then drawn over an anvil 42. As can be seen in FIG. 3, the anvil 42 has first and second surfaces 44, 46 which are separated by a blade rim 48. The first and second surfaces 44, 46 of the anvil 42 are opposing one another. The slit-flattened tube 34 is drawn over the anvil 42 such that a first side of the tube 50 is on the first surface 44 of the anvil and a second side 52 of the tube is on the second, opposing surface 46 of the anvil.

Figure 4:
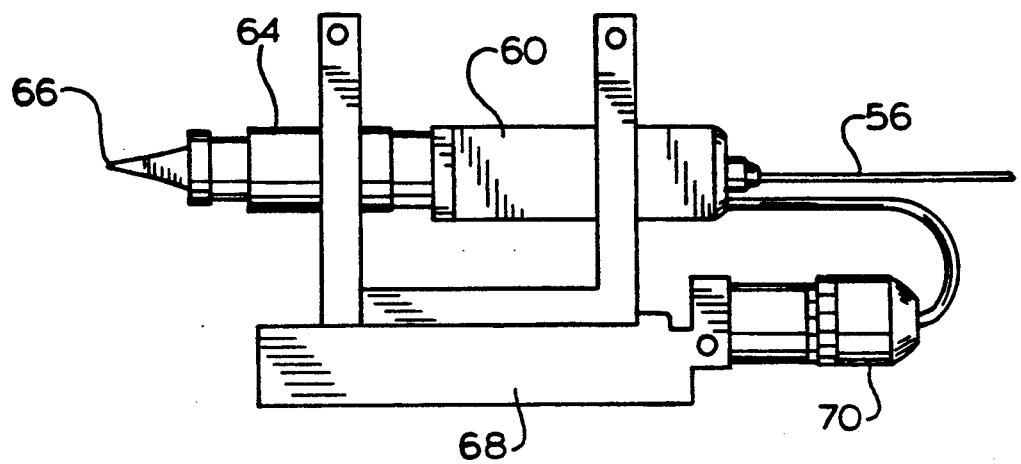
FIG. 4 is a side view of an ultrasonic energy converter/horn/adjustment assembly used in one embodiment of the invention.
Figure 5:
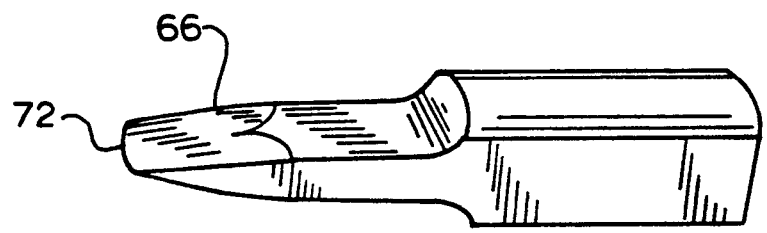
FIG. 5 is a perspective view of a horn tip used in the preferred embodiment of the invention.
Figure 6:
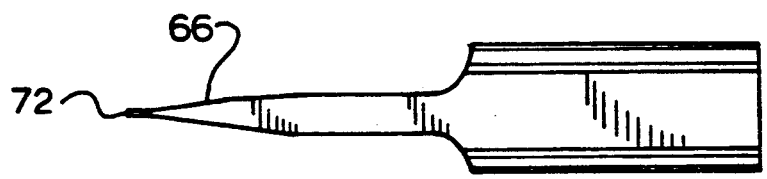
FIG. 6 is a side view of a horn tip illustrated in FIG. 5.

Ultrasonic energy is continuously generated at a power supply 54. This energy is transmitted through wires 56, 58 to a pair of ultrasonic converters 60, 62 located on opposite sides of the anvil 46. Each converter is illustrated in greater detail in FIG. 4. As can be seen in the figure, energy from the energy source is transmitted to a converter 60 through a wire 56. The converter 60 converts the electronic energy into ultrasonic vibration. The converter causes a horn 64 to vibrate at a selected frequency. The frequency of the vibration of the horn can range from 20 kHz to 70 kHz depending on the type of material to be scored. The vibration of the horn 64 causes a tip 66 to also vibrate. In the preferred embodiment of the invention, the horn and tip both vibrate at the same frequency. The tip, therefore, must be carefully designed to allow the tip to resonate at the same frequency as the horn even though they are different sizes and shapes. Various shapes can be used to form the tip 66. However, since it is desired to have the tip 66 and the horn 64 vibrate at the same frequency, not all shapes can be used. One shape which has been successfully used is illustrated in FIGS. 5 and 6. Referring once again to FIG. 4, the converter 60, horn 64 and tip 66 are mounted on a base 68 which includes various adjusting devices such as a fine micrometer adjustment device 70. Thus, the location of tip 66 can be exactly determined and adjusted so that the distance between the tip and the anvil can be precisely controlled.

A score is produced in each side 50, 52 of the slit-flattened tube 34 by applying ultrasonic energy through tip 66 to the sides of the tube. Since the frequency of the vibration of the tip 66 and the location of the tip are precisely controlled, the material remaining after a score is produced in the tube 34 is precisely controlled as well. This ability to control precisely the amount of material remaining is a key feature in the subject invention. During the manufacturing process, the thickness of the film used to produce a pouch may vary. Although such variations are generally very small, these variations can impact the consistency of the strength of the score if other techniques are used to produce the score which control the depth of the score rather than the amount of material remaining after the score is produced. Therefore, the subject invention has significant advantages over other techniques.

The use of an ultrasonic tip to score a thermoplastic film has been found to cause the film to be scored by physically displacing the film as it passes under the tip. This is illustrated in FIG. 7. As noted above, since the location of the tip 66 can be accurately adjusted, a fixed distance between anvil 42 and the distal edge 72 of the tip 66 can be precisely maintained. Thus the amount of material 74 remaining at the score line 76 can be precisely controlled.

Referring once again to FIG. 1, after a score has been produced in score unit 36, the thermoplastic film can be transferred to a printing press 78 to imprint labels on the slit-flattened film. The film is then wound into a roll on a winder 80. The roll 82 is then transferred to another station (not shown) to convert the slit-scored, flattened film into individual pouches. A pouch 84 produced using the method described above is illustrated in FIG. 8.

Figure 9:
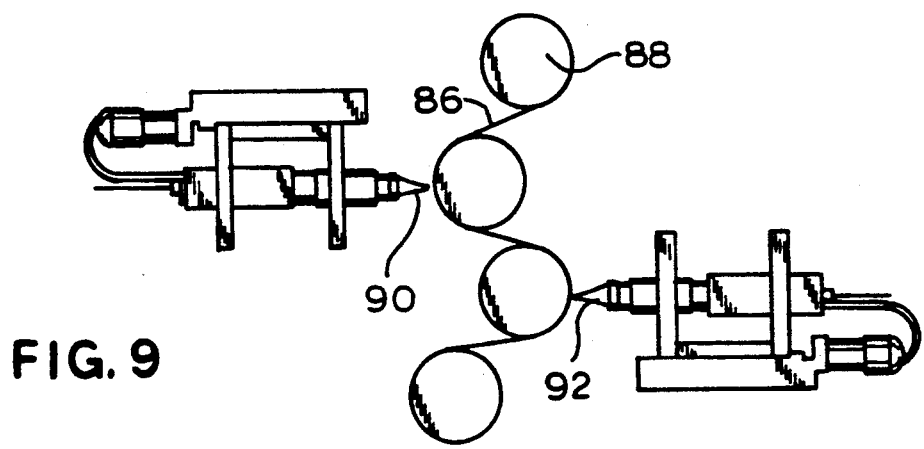
FIG. 9 illustrates an alternative method of sequentially scoring opposite sides of a non-slit web in accordance with one embodiment of the invention.

The method of scoring pouches described above is the currently preferred method. However, other methods may be used. For instance, FIG. 9 illustrates another method of scoring pouches by passing a non-slit web 86 through a series of rollers 88 to alternatively score opposite sides of the web using ultrasonic horn tips 90 and 92.

As will be obvious to one skilled in the art, various thermoplastic materials can be used to form the film. Generally speaking, relatively low-density thermoplastic films are a more desirable material for the process of forming plastic pouches because they have desirable physical properties. For instance, low-density thermoplastic films are easily processed and have generally have a desirable impact strength, relatively high puncture resistance and resistance to pin holing. In addition, many low-density thermoplastic films are compatible with a broad spectrum of additive packages to produce films having varying physical properties and appearance. Generally, low-density thermoplastic films having a density in the range of 0.870 to 0.960 g/cm$^3$ are desirable. In one embodiment of the invention, a thermoplastic film having a density of 0.880 to 0.950 g/cm$^3$ is used. Preferably, a film having a density in the range of 0.890 to 0.942 g/cm$^3$ is used. Generally, the frequency required to produce the desired deformation in a thermoplastic film is inversely proportional to the density of the film. However, this relationship is not a linear relationship. Therefore, since a low-density film is used in the preferred embodiment of the invention, a relatively high ultrasonic frequency is used to produce the desired score. Accordingly, a tip that vibrates at 70 kHz is used in the preferred embodiment of the invention to produce the score.

The density of the film used also affects the strength of the film. Generally speaking, a low-density film has a higher elasticity than a high-density film. Therefore, if a low-density film is used, it is generally desirable to leave a smaller amount of material at the score line than when a higher density material is used. Thus, it is generally desirable that the distance between the ultrasonic energy source, or tip, and the anvil is relatively small when a low-density film is used and is relatively large when a high-density film is used.

A similar relationship exists between the blow up ratio and distance between the tip and anvil. When a film undergoes a relatively high blow up ratio, the orientation of the polymeric chains in the film tend to become bi-axially oriented. This bi-axial orientation produces a film which is generally more difficult to tear. Therefore, the distance between the tip and the anvil is decreased when a film undergoes a relatively high blow up ratio and is increased when the same film undergoes a relatively low blow up ratio. Relatively high blow up ratios are considered to be in the range of 1.75:1 to 3:1. Relatively low blow up ratios are considered to be in the range of 0.5:1 to 1.2:1.

Figure 10:
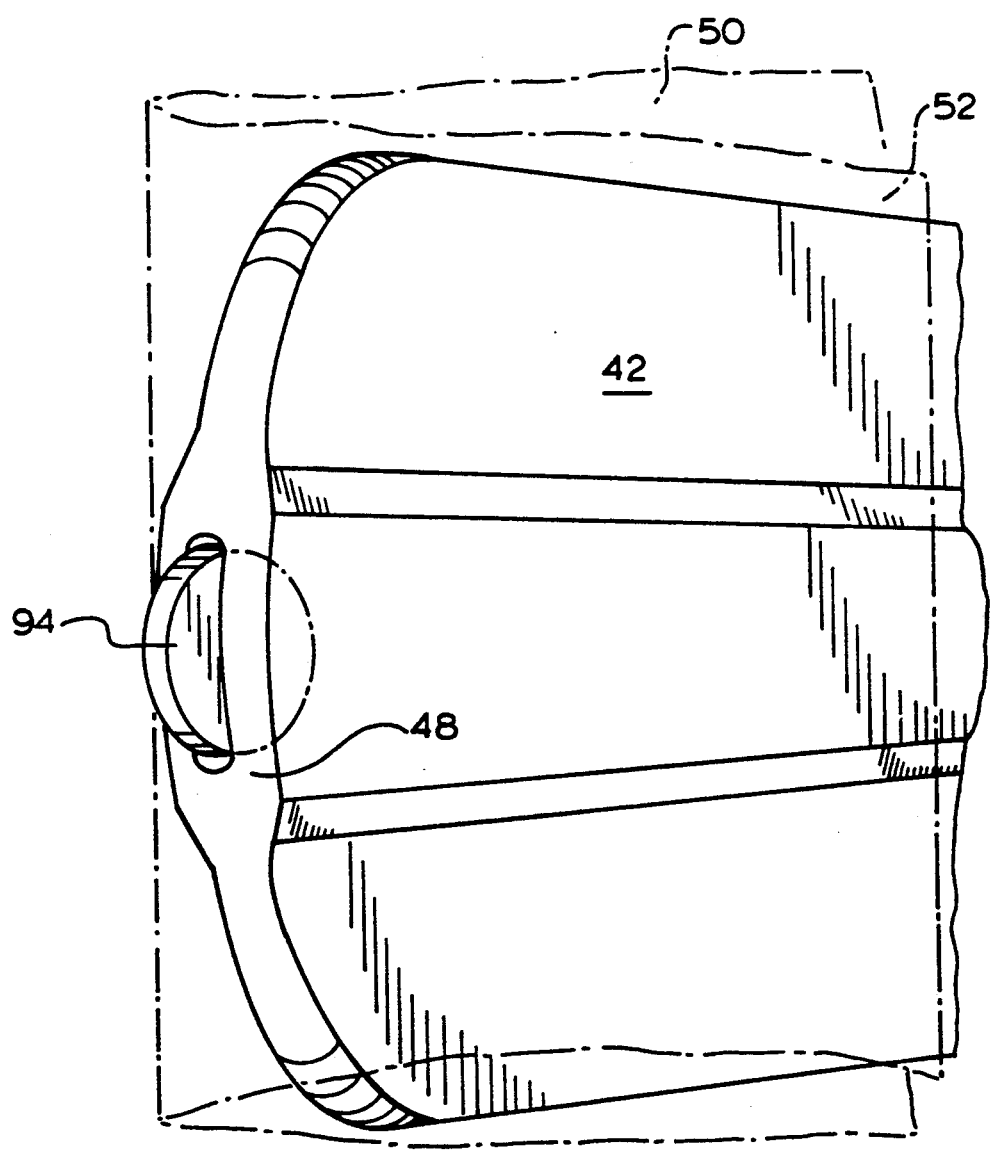
FIG. 10 is an end view of a blade rim of an anvil used in the preferred embodiment of the invention.

Refer now to FIG. 10 which is an end view of the blade rim 48 of an anvil 42. In the preferred embodiment, the blade rim includes a wheel 94 to reduce the coefficient of friction of the blade rim. The purpose of the wheel 94 is to allow the folded edge of film to pass more easily over the blade rim of the anvil without dragging. Other methods of reducing the coefficient of friction across the blade rim may be used. For example, in one embodiment, a stream of air may be emitted from the blade rim. In another embodiment, a low friction coating may be applied to the blade rim or to the entire surface of the anvil.

The thickness of film produced can vary depending on the type of material used and the particular physical characteristics desired. However, generally speaking, a single side thickness of between 0.001 inches and 0.020 inches is desirable when a blown film process is used. In the preferred embodiment of the invention, the single side thickness of a thermoplastic film ranges between 0.0015 inches and 0.005 inches. The amount of material remaining in the score line in the preferred embodiment ranges between 0.0002 inches to 0.0045 inches.

As will be obvious to one skilled in the art, films having various tensile strengths can be used. In the preferred embodiment of the invention, a film having a tensile strength of 2.000 PSI to 10.000 PSI machine direction (MD) and transverse direction (TD) is used. In the preferred embodiment, the first and second sheets of the pouch have a score line that has a predictable weakness of 1.0 pounds per linear inch (PLI) to 15.0 PLI.

While the invention has been described in detail and with reference to specific embodiments thereof, it will be apparent to those skilled int heart that various changes and modifications can be made therein without departing from the spirit and scope of the invention.

We claim:

1. A method of creating a predictably weakened area in thermoplastic film, comprising the steps of:

extruding a molten thermoplastic material through an annular orifice to create a molten continuous tube;

introducing a gas inside said molten continuous tube to control the size of said tube in which varying the quantity of gas introduced in said tube will vary the diameter of said molten tube to form a blow-up ratio between said molten tube and said annular orifice;

allowing said molten continuous tube to harden into a thermoplastic film tube;

collapsing said film tube to allow opposite sides of said film tube to touch one another to form a flattened tube having first and second edges;

slitting said first edge of said flattened tube to form a slit-flattened tube having first and second sides connected to one another at said second edge;

maintaining first and second tips at predetermined distances from an anvil, said anvil having first and second surfaces separated by a blade rim, said first tip being located a first predetermined distance from said first surface and said second tip being located a second predetermined distance from said second surface;

drawing said second edge of said slit-flattened tube over said anvil such that said first side of said tube is between said first tip and said first surface of said anvil and said second side of said tube is between said second tip and said second surface of said anvil; and continuously applying an ultrasonic energy source through said first and second tips to said first and second sides of said slit-flattened tube to create a line of predictable weakness on said first and second sides of said slit-flattened tube.

2. A method of creating a predictably weakened area in thermoplastic film as set forth in claim 1 wherein said step of continuously applying an ultrasonic energy source further comprises:
continuously applying ultrasonic energy in the range of 20 to 70 kHz to said first and second sides of said slit-flattened tube.

3. A method of creating a predictably weakened area in thermoplastic film as set forth in claim 2 wherein said step of continuously applying an ultrasonic energy source further comprises:
continuously applying ultrasonic energy at 70 kHz to said first and second sides of said slit-flattened tube when said tube is formed of a relatively low density thermoplastic film.

4. A method of creating a predictably weakened area in thermoplastic film as set forth in claim 3 wherein said step of continuously applying an ultrasonic energy source further comprises:
continuously applying ultrasonic energy at 70 kHz to said first and second sides of said slit-flattened tube when said tube is formed of a thermoplastic film having a density in the range of 0.870 to 0.960 g/cm$^3$.

5. A method of creating a predictably weakened area in thermoplastic film as set forth in claim 4 wherein said step of continuously applying an ultrasonic energy source further comprises:
maintaining said ultrasonic energy source at a predetermined distance from said anvil.

6. A method of creating a predictably weakened area in thermoplastic film as set forth in claim 4 wherein said step of continuously applying an ultrasonic energy source further comprises:
maintaining said ultrasonic energy source at a predetermined distance from said anvil such that said predetermined distance is relatively small when a low-density film is used and is relatively large when a high-density film is used.

7. A method of creating a predictably weakened area in thermoplastic film as set forth in claim 6 wherein said step of continuously applying an ultrasonic energy source further comprises:
maintaining said ultrasonic energy source at a predetermined distance from said anvil such that said predetermined distance is relatively small when a relatively high blow-up ratio is used and is relatively large when a relatively low blow-up ratio is used.

8. A method of creating a predictably weakened area in thermoplastic film as set forth in claim 1 wherein said step of continuously applying an ultrasonic energy source to said first and second sides of said slit-flattened tube to create a line of predictable weakness on said first and second sides of said slit-flattened tube includes:
providing a source of ultrasonic energy that vibrates at a predetermined frequency; and
providing a tip that is tuned to vibrate at said predetermined frequency.

9. A method of creating a predictably weakened area in thermoplastic film as recited in claim 1 wherein said step of continuously applying an ultrasonic energy source to said first and second sides of said slit-flattened tube to create a line of predictable weakness on said first and second sides of said slit-flattened tube includes:
providing a source of ultrasonic energy that vibrates at a predetermined frequency of 70 kHz; and
providing a tip that is tuned to vibrate at 70 kHz.

10. A method of creating a predictably weakened area in thermoplastic film as recited in claim 1 further comprising: providing a means for lowering the coefficient of friction at said blade rim of said anvil.

11. A method of creating a predictably weakened area in thermoplastic film as recited in claim 1 further comprising:
providing a means for lowering the coefficient of friction at said blade rim of said anvil by providing a fold-guide wheel within said blade rim.

12. A method of creating a predictably weakened area in thermoplastic film as recited in claim 1 further comprising:
providing a means for lowering the coefficient of friction at said blade rim of said anvil by providing a stream of air emitted from said blade rim.

13. A method of creating a predictably weakened area in thermoplastic film as recited in claim 1 further comprising:
providing a means for lowering the coefficient of friction at said blade rim of said anvil by providing a coating on said blade rim.

14. A method of creating a predictably weakened area in thermoplastic film as recited in claim 1, wherein the step of extruding a molten thermoplastic material through an annular orifice to create a molten continuous tube further comprises:
extruding a thermoplastic material having a density ranging from 0.870 to 0.960 gm/cm$^3$.

15. A method of creating a predictably weakened area in thermoplastic film as recited in claim 1, wherein the step of extruding a molten thermoplastic material through an annular orifice to create a molten continuous tube further comprises:
extruding a thermoplastic material having a density ranging from 0.890 to 0.942 gm/cm$^3$.

16. A method of creating a predictably weakened area in thermoplastic film as recited in claim 1, wherein the step of extruding a molten thermoplastic material through an annular orifice to create a molten continuous tube further comprises:
extruding a thermoplastic material at a rate designed to from a flattened tube having a single-side thickness between 0.001 inches and 0.020 inches.

17. A method of creating a predictably weakened area in thermoplastic film as recited in claim 1, wherein the step of extruding a molten thermoplastic material through an annular orifice to create a molten continuous tube further comprises:
extruding a thermoplastic material at a rate to form a flattened tube having a single-side thickness between 0.0015 inches and 0.005 inches.

18. A method of creating a predictably weakened area in thermoplastic film, as recited in claim 16 wherein the step of continuously applying an ultrasonic energy source to said first and second sides of said slit-flattened tube to create a line of predictable weakness on said first and second sides of said slit-flattened tube further comprises applying said energy source to form a line of weakness having a thickness ranging from 0.0002 inches to 0.0045 inches.

19. A method of creating a predictably weakened area in thermoplastic film, comprising the steps of:
extruding a molten thermoplastic material through an annular orifice to create a molten continuous tube;

introducing a gas inside said molten continuous tube to control the size of said tube in which varying the quantity of gas introduced in said tube will vary the diameter of said molten tube to form a blow-up ratio between said molten tube and said annular orifice;

allowing said molten continuous tube to harden into a thermoplastic film tube;

collapsing said film tube to allow opposite sides of said film tube to touch one another to form a flattened tube having first and second edges;

maintaining a first tip at a first predetermined distance from a first roller;

drawing said flattened tube over said first roller to expose a first side of said tube such that said first side of said tube is between said first tip and said first roller;

continuously applying a first ultrasonic energy source through said first tip to said first side of said flattened tube to create a line of predictable weakness on said first side of said flattened tube;

maintaining a second tip at a second predetermined distance from a second roller;

drawing said flattened tube over said second roller to expose a second side of said tube such that said second side of said tube is between said second tip and said second roller; and continuously applying a second ultrasonic energy source through a second tip to said second side of said flattened tube to create a line of predictable weakness on said second side of said flattened tube.

* * * * *